Patented Apr. 5, 1949

2,466,507

UNITED STATES PATENT OFFICE 2,466,507

METHOD OF MAKING FLUORIDE GLASS

Kuan-Han Sun, Rochester, N. Y., assignor to Eastman Kodak Company, Rochester, N. Y., a corporation of New Jersey No Drawing. Application May 15, 1946, Serial No. 670,019

10 Claims. (Cl. 106—47)

This invention relates to improvements in methods of making the fluoride glasses disclosed and generically covered in the pending application of myself and Maurice L. Huggins, Serial No. 568,314, filed December 15, 1944.

It has been found that some of the mixtures of fluorides disclosed in that application, when melted down to a liquid, frequently appear cloudy or hazy or contain some insoluble "oxide" flakes which become imbedded in the final block of glass. This appears to be the case particularly when a relatively small number of components is used, as in some of the examples given in the above application.

Although the flakes may be removed either by mechanical means or by the introduction of ammonium fluoride, $NH_4F$, or ammonium hydrogen fluoride, $NH_4HF_2$, both of which completely volatilize finally, or by the introduction of beryllium fluoride, $BeF_2$, in the form of ammonium beryllium fluoride $(NH_4)_2BeF_4$, there still was frequently present an objectionable amount of cloudiness or haziness.

The use of ammonium fluorides herein described is mentioned but is not specifically claimed in the above-mentioned application. By the term "ammonium fluoride" I mean any such fluoride containing ammonium. Ammonium fluoride or acid fluoride, as such or in complex combined form, is effective in removing water content, or oxide impurities in fluoride batches, or fluoride raw materials. The larger the amount, the more effective it is. However, the ammonium fluorides volatilize completely at the end and constitute a total loss. Because of this the amount used is not at all critical, but should be at least five per cent by weight of the batch and may be as high as thirty per cent. In practice I use from ten to twenty per cent. The treatment of fluoride raw materials with ammonium fluorides may be previously and individually carried out at a temperature between 150° to 400° C. before introducing in the batch, if it is so desired.

I have found that the cloudiness or haziness can be avoided by the introduction of about one per cent by weight of a phosphorus pentahalide and particularly of phosphorus pentachloride or pentafluoride. While the latter is probably the most effective agent, it is a poisonous gas and inconvenient to use. Hence, the pentachloride is preferable for actual production. As much as five per cent can be introduced, but more than one or one and a half per cent is unnecessary, and, moreover, the chloride modifies the optical properties of the glass. Although this material dissolves readily in the liquid glass, it is volatile and should be added after the batch is in a completely liquid form, but before the temperature has begun to be lowered. The vessel should be closed as soon as it is introduced, and the liquid glass shaken or stirred constantly. Phosphorus pentachloride used should be resublimed and kept in paraffin-sealed vessel away from moisture.

The optical properties of the glasses to which the phosphorus halide has been added are not very different from those without. Illustrative comparative examples with and without one per cent by weight of the pentachloride are given in the following tables, both weight and molar percentages of the main glass-forming ingredients being given under the letters W and M, respectively. The percentages as given total 100 before the addition of the phosphorus halide.

| Example | 1 | | 2 | | 3 | | 4 | |
|---|---|---|---|---|---|---|---|---|
|  | W | M | W | M | W | M | W | M |
| $MgF_2$ | 12.6 | 17 | 12.2 | 17.0 | 12.3 | 15.5 | 12.8 | 17.0 |
| $CaF_2$ | 4.7 | 5 | 4.5 | 5.0 | 13.4 | 13.5 | 4.7 | 5.0 |
| $SrF_2$ | 3.0 | 2 | 4.3 | 3.0 | 8.0 | 5.0 | 3.0 | 3.0 |
| $BaF_2$ | 27.2 | 13 | 26.3 | 13.0 | 11.1 | 5.0 | 27.5 | 13.0 |
| $LaF_3$ | 2.3 | 1 | 3.4 | 1.5 | 2.5 | 1.0 |  |  |
| $CeF_3$ | 4.7 | 2 | 4.5 | 2.0 | 5.0 | 2.0 | 3.6 | 1.5 |
| $ThF_4$ | 3.7 | 1 | 5.3 | 1.5 | 3.9 | 1.0 | 5.6 | 1.5 |
| $AlF_3$ | 20.0 | 20 | 19.4 | 20.0 | 22.3 | 21.0 | 20.2 | 20.0 |
| $BeF_2$ | 21.8 | 39 | 20.1 | 37.0 | 21.5 | 36.0 | 22.6 | 40.0 |
| $PCl_5$ |  |  | 1.0 |  |  |  | 1.0 |  |
| $n_D$ | 1.3874 | | 1.3882 | | 1.383 | | 1.3821 | |
| $\nu$ | 98.4 | | 99.5 | | 100.0 | | 99.6 | |

These may also be compared with the formulas given in the Sun and Huggins specification referred to above wherein are to be found examples in which one or several of the fluorides mentioned are omitted. It will be noticed, however, that in most of the examples therein, as in those above given, there are present (a) $MgF_2$, (b) one or more of the alkaline earth fluorides, $CaF_2$, $SrF_2$, and $BaF_2$, (c) one or more of $LaF_3$, $CeF_3$, and $ThF_4$, (d) $AlF_3$, and (e) $BeF_2$. For simplicity the fluorides in each group may be treated as a single fluoride, provided the substitution in each group is made atomically or ionically. Furthermore, it has been found that a glass having the highest moisture resistance should not contain materially more than 40 mole per cent of beryllium fluoride, while if it contains materially less, good vitrification does not take place. If too much aluminum fluoride is substituted for beryllium fluoride, it tends to induce devitrification, Moreover, with formulas containing lead fluoride, the lead tends to attack the crucible if it is made of platinum. Although cerium and thorium fluorides help to decrease the tendency to devitrification, the former shifts the ultraviolet transmission toward the longer wave length, and the latter has radioactivity, which is objectionable if the glass is positioned for long periods near photographic film, as in a folding camera. Good glasses can be made without $CeF_3$ or $ThF_4$, respectively. Moreover, if the sum of the lanthanum, cerium, and thorium fluorides materially exceeds 6 or 7 mole per cent, good glass is not readily obtainable. Under all these circumstances it is evident that the possibilities of variation in composition are very narrowed to rather limited ranges. Although good glasses have been obtained outside of the ranges indicated, it has been my experience that the combinations mentioned, involving a considerable number of ingredients, yield particularly useful glasses that are producible in batches of a size to warrant commercial production.

With such a narrow choice of ingredients and composition ranges, it is difficult to avoid haziness, and the use of phosphorus halide is therefore particularly useful in these glasses. The amount to be introduced is not critical and has to be determined by experience with different formulas.

When in the claims I use the expression "fluoride selected from," I use the word "fluoride" collectively to include one or more fluorides.

Having thus described my invention, what I claim is:

1. The method of avoiding haziness in glass consisting of fluorides that comprises adding to the molten batch a phosphorus pentahalide in an amount less than five per cent by weight of the glass and at least one half of one per cent.

2. The method of avoiding haziness in glass consisting of fluorides that comprises adding to the molten batch phosphorus pentachloride in an amount less than five per cent by weight of the glass and at least one half of one per cent.

3. The method of avoiding haziness in glass consisting of fluorides that comprises adding to the molten batch phosphorus pentafluoride in an amount less than five per cent by weight of the glass and at least one half of one per cent.

4. Fluoride glass resulting from a glass batch consisting of (a) magnesium fluoride, (b) fluoride selected from the group consisting of the fluorides of calcium, barium, and strontium, (c) fluoride selected from the group consisting of the lanthanum, cerium, and thorium fluorides, (d) aluminum fluoride and (e) beryllium fluorides and also containing less than five per cent by weight of a phosphorus pentahalide and at least one half of one per cent.

5. A glass as defined in claim 4 in which the phosphorus pentahalide is phosphorus pentachloride.

6. A glass as defined in claim 4 in which the phosphorus pentahalide is phosphorus pentafluoride.

7. The method of avoiding "oxide" flakes in glass consisting of fluorides that comprises adding to the batch an ammonium fluoride in an amount larger than five per cent by weight of the batch and less than thirty per cent.

8. The method of avoiding the presence of "oxide" flakes in fluoride glass that comprises adding to the materials of the batch from which the glass is made an ammonium fluoride in an amount larger than five per cent by weight of the batch and less than thirty per cent.

9. The method of introducing beryllium fluoride into fluoride glass that comprises adding ammonium beryllium fluoride to the batch from which the glass is made.

10. The method of avoiding the presence of "oxide" flakes and of haziness in fluoride glass that comprises adding an ammonium fluoride to the materials of the batch from which the glass is made in an amount greater than five per cent by weight of the batch and less than thirty per cent and adding a phosphorus pentahalide to the batch while in a molten state in an amount less than five per cent of the batch and at least one half of one per cent.

KUAN-HAN SUN.

No references cited.